United States Patent [19]

Long

[11] Patent Number: 4,748,501
[45] Date of Patent: May 31, 1988

[54] CABLE CONVERTER FOR TELEVISION SIGNALS WITH STEREO AUDIO SIGNAL

[75] Inventor: Michael E. Long, Western Springs, Ill.

[73] Assignee: Zenith Electronics Corporation, Glenview, Ill.

[21] Appl. No.: 680,616

[22] Filed: Dec. 11, 1984

[51] Int. Cl.<sup>4</sup> .......................... H04N 5/60; H04N 7/10
[52] U.S. Cl. ...................................... 358/86; 358/198; 358/194.1
[58] Field of Search ................. 358/86, 114, 120, 121, 358/122, 123, 144, 194.1, 197, 198, 349; 455/3, 4, 6; 380/10, 15, 19, 20

[56] References Cited

U.S. PATENT DOCUMENTS

| | | | |
|---|---|---|---|
| 3,936,594 | 2/1976 | Schubin et al. | 358/144 |
| 4,339,772 | 7/1982 | Eilers et al. | 358/144 |
| 4,395,734 | 7/1983 | Rypkema | 358/194.1 |
| 4,536,798 | 8/1985 | Reid, Jr. et al. | 358/86 X |
| 4,603,349 | 7/1986 | Robbins | 358/86 |
| 4,630,113 | 12/1986 | Long | 358/86 X |
| 4,633,316 | 12/1986 | Burke et al. | 358/197 |
| 4,646,150 | 2/1987 | Robbins et al. | 358/144 |

FOREIGN PATENT DOCUMENTS

| | | | |
|---|---|---|---|
| 3245565 | 9/1983 | Fed. Rep. of Germany | 358/144 |
| 59-62278 | 4/1984 | Japan | 358/198 |

*Primary Examiner*—Keith E. George

[57] ABSTRACT

A cable converter for a television signal transmission having a stereo audio signal includes a coaxial output jack supplied with a 4.5 MHz aural intercarrier and a DC voltage for volume control and mute purposes. An interface circuit includes a pair of transistors connected in series for controlling the DC voltage level on the output jack as a function of desired volume level. One of the two transistors functions as a switch that may be operated from the cable head-end to provide a mute voltage level at the output jack for disabling the audio for nonauthorized channels. Optionally, a head-end control signal may operate another transistor for preventing coupling of the 4.5 Mhz aural intercarrier to the output jack.

5 Claims, 2 Drawing Sheets

CABLE CONVERTER FOR TELEVISION SIGNALS WITH STEREO AUDIO SIGNAL

BACKGROUND OF THE INVENTION AND PRIOR ART

This invention relates generally to cable converters and, specifically, to cable converters equipped to process a television signal transmission having a stereo audio signal.

Recently, "stereo television", that is a television signal with two separate audio channels, has been made available. The additional audio information is included on a separate subcarrier of the 4.5 MHz aural intercarrier in the conventional NTSC television signal. Properly equipped television receivers are capable of decoding the additional information on the aural intercarrier and, by further processing, for producing separate audio information channels.

A large number of television receivers are employed in cable-connected systems where television signals are received via a coaxial cable from a so-called "head-end", as distinct from being received as over-the-air transmissions. The cable systems include cable converters for receiving television programming carried on a plurality of channels, selecting a desired one of the channels, demodulating the television program signal thereon and remodulating it onto a fixed carrier of VHF channel frequency, normally corresponding to VHF channel 3 or VHF channel 4 (channel $\frac{3}{4}$). The converter generally includes apparatus and appropriate circuitry for permitting the subscriber to remotely control the channel selection mechanism in the converter and to exert control over the volume level of the audio information in the received television signal. The converter is also controllable from the cable head-end by means of appropriate built-in signalling circuitry. Thus any converter may be selectively enabled to receive all channels or to not receive one or more so-called "premium" channels, depending upon the level of service the subscriber has requested and paid for. The converter can thus be "authorized" for regular or premium channels by means of an authorization signal transmitted from the head-end to that individual converter. Thus, the cable operator can offer his subscribers different levels of programming, with correspondingly different fee structures.

The advent of stereo TV, that is television with dual audio channel capability usually in the form of a stereo audio signal, proved troublesome for cable operators since subscribers may have "stereo television" receivers or want to take advantage of the dual channel audio capability of such television programs. Present design baseband converter/decoders do not include audio demodulators and RF remodulators of sufficient quality to provide proper stereo audio TV signals to subscriber home equipment.

Stereo audio adapter units are commercially available for accepting the 4.5 MHz detected aural intercarrier and its stereo signal, processing it and providing separate left and right channel audio outputs for driving separate speakers. One such adapter, marketed by Zenith Electronics Corporation under the model designation CV 524, includes a DIN type multi-pin jack for receiving, by means of a mating plug, appropriate signals for developing the stereo audio information from normal, that is, monaural (mono) television receivers that have been adapted to provide the appropriate signals. Appropriate kits are also available for adapting a mono television receiver for use with such a stereo audio adapter.

In copending application Ser. No. 649,396, filed Sept. 11, 1984, now U.S. Pat. No. 4,630,113, issued Dec. 16, 1986, in the name of Michael E. Long and assigned to Zenith Electronics Corporation, a very simple bypass circuit is disclosed for enabling a cable converter to "process" television signals having a stereo audio signal. In that application, a switch is provided on the converter for selecting or enabling either a "standard" audio path or a "bypass" audio path. With the bypass audio path enabled, the 4.5 MHz aural intercarrier is shunted around the converter decoding circuitry and made directly available at an output. The cable converter normally provides the user with remotely controllable audio as well as an audio mute function. A mute control, which also serves as an authorization control for the cable head-end, is retained when operating in the stereo mode by disabling the bypass path in response to a mute remote control signal from a user or a deauthorization signal from the cable head-end. The user does lose the ability to control the level of the stereo audio signal in a continuous manner, although he retains a mute control and the head-end retains an authorization control of the converter. That simple circuit may suffice for many installations.

A straight-forward solution to enable full utilization of the cable converter capabilities is to provide a plurality of terminals on the converter for interconnecting with corresponding terminals on the stereo adapter unit. Such a solution, in the situation mentioned for the CV 524 adapter unit, would necessitate installing a multiple contact DIN jack on the converter and would prove quite expensive. Furthermore, subscribers who possess stereo television receivers would, in all likelihood, want to utilize the full capabilities of those television receivers and not be forced to purchase and use a separate stereo adapter unit. Thus, there is a need in the art for a cable converter that is capable of providing in a simple, cost-effective way, the stereo audio signal information in an appropriate television transmission.

OBJECTS OF THE INVENTION

A principal object of the invention is to provide a novel cable converter.

Another object of the invention is to provide a cost-effective cable converter that can supply a TV stereo audio signal for use by peripheral equipment.

A further object of the invention is to provide a simple cable converter for a television transmission including a stereo audio signal.

SUMMARY OF THE INVENTION

In accordance with the invention a cable converter includes an input terminal and an output terminal and means for translating a television transmission including a stereo audio signal. A television transmission is received at the input terminal and a 4.5 MHz aural intercarrier containing the stereo audio signal is developed. Means are also provided for developing an audio level signal. Interface means combine the 4.5 MHz aural intercarrier and the audio level signal and apply it to the output terminal.

BRIEF DESCRIPTION OF THE DRAWINGS

Further objects and advantages of the invention will be apparent upon reading the following description in conjunction with the drawings in which.

DESCRIPTION OF THE PREFERRED EMBODIMENT

Figure 1:
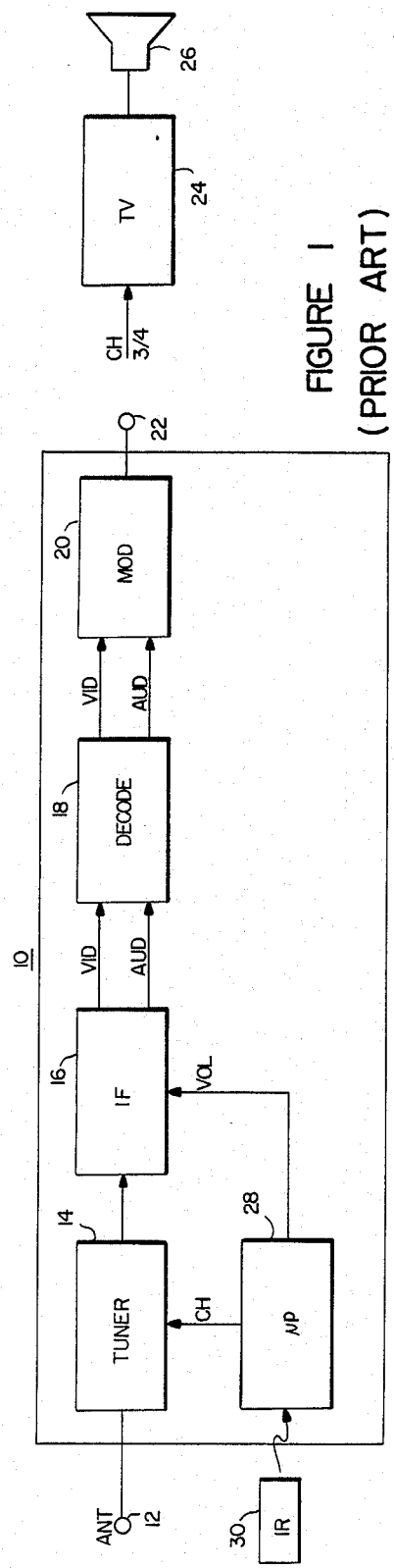
FIG. 1 is a block diagram of a prior art cable converter.

In the prior art construction of FIG. 1, a baseband cable converter/decoder 10 includes an antenna terminal 12 coupled to a television signal Tuner 14 which, in turn, is coupled to an intermediate frequency (IF) section 16. A particular prior art construction is utilized in products manufactured by ZENITH ELECTRONICS CORPORATION (formerly ZENITH RADIO CORPORATION) and fully disclosed and described in Technical Training Program publication TP27, dated January, 1982, pages B-11 to B-16, which publication is hereby incorporated by reference. In that publication, the IF section is seen to include a synchronous detector for demodulating the video signal and a 4.5 MHz audio detector for developing an audio signal. The output of the synchronous detector, which is generally referred to as C2, includes both demodulated video and the 4.5 MHz aural intercarrier. C2 is applied to a 4.5 MHz trap to produce the video output signal and is applied through a 4.5 MHz bandpass filter and an audio detector to produce the audio signal that includes a synchronous detector for demodulating the video signal and a 4.5 MHz audio detector for developing an audio signal. The output of the synchronous detector, generally referred to as C2, includes both demodulated video and the 4.5 MHz aural intercarrier. C2 is applied to a 4.5 MHz trap to produce the video output signal and is applied through a 4.5 MHz bandpass filter and an audio detector to produce the audio signal. This arrangement is well known in the art. The video and audio outputs are provided from IF 16 to a Decoder 18, where appropriate cable head-end control of the converter may be exercised by well-known appropriate signal control circuitry (not shown). The decoded video and audio outputs from the Decoder 18 are supplied to a Modulator 20 where the input information is remodulated to VHF channel ¾ and supplied to an output terminal 22. As illustrated, a television receiver 24 with a monaural speaker 26 may be coupled to output terminal 22. A microprocessor 28 is included in the converter for operating the channel selection function of Tuner 14 and for changing the volume or level of the audio information in the received television signal. This is illustrated by leads labelled CH and VOL coupled from microprocessor 28 to Tuner 14 and IF section 16, respectively. Microprocessor 28 is controllable from a remote point by means of signals transmitted by an infrared (IR) remote control transmitter 30. In the prior art construction the audio demodulator circuitry of IF 16 and audio remodulation circuitry of modulator 20 are not of sufficient performance quality to reproduce the full spectrum audio incorporating the stereo signals.

Figure 2:
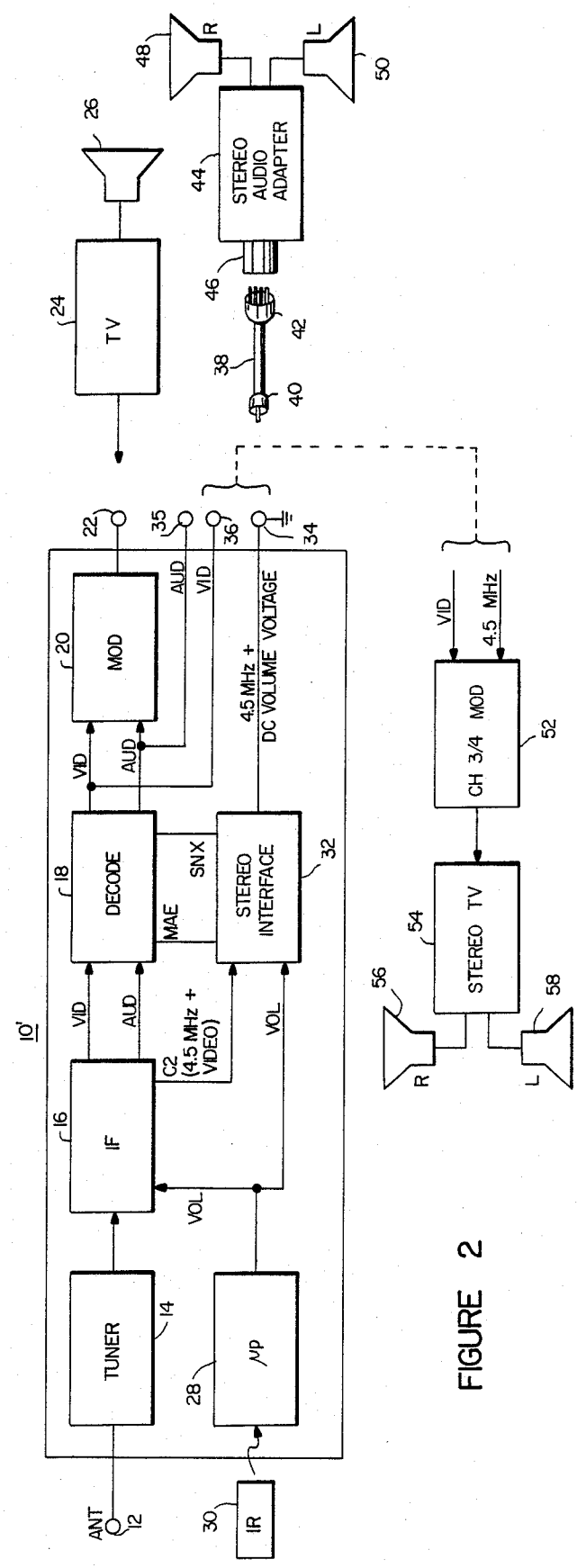
FIG. 2 is a block diagram of a cable converter constructed in accordance with the invention.

In FIG. 2, modifications to the prior art converter of FIG. 1 are shown. The converter is identified as 10' and like-numbered components should be understood to have similar functions in the different figures. In FIG. 2, stereo interface means 32 have been included. Stereo interface means 32 are coupled to IF section 16 by a lead labelled C2 and to Decoder 18 by leads labelled MAE and SNX. Additionally, microprocessor 28 is coupled thereto by the VOL lead. The output of stereo interface means 32 is provided to a single output terminal 34, that is indicated as having a 4.5 MHz aural intercarrier and a DC voltage applied thereto. It will be appreciated that the 4.5 MHz aural intercarrier includes the stereo audio signal and that the DC voltage is indicative of its volume. Additionally, separate baseband video and audio signals are provided at a pair of output terminals 35 and 36, respectively, for use by a video cassette recorder (VCR), for example.

A stereo audio adapter 44 includes a multi-pin jack 46 and is connected to a pair of stereo speakers 48 and 50. Multi-pin jack 46 is connectable to a mating multi-pin plug 42 which, as will be shown, is connected, over an appropriate pair of wires in a cable 38, to a coaxial plug 40 for interconnection with the single output terminal 34 of the converter. In accordance with the invention, output terminal 34 may be a simple "RCA" type phono jack, having a center conductor surrounded by and insulated from a ground conductor. Accordingly, plug 40 is preferably a simple phono plug and cable 38 is a simple coaxial shielded conductor.

An additional external channel ¾ modulator adapter 52 may be connected, as shown by a dotted line, to video terminal 36 and coaxial output jack 34 of converter 10'. Modulator 52 is coupled to a stereo television receiver 54 that includes a pair of stereo speakers 56 and 58. The figure thus illustrates use of converter 10' in different modes. When used with stereo audio adapter 44 and mono TV 24, the stereo adapter is coupled to coaxial output jack 34 by means of coaxial plug 40, cable 38 and multi-pin plug 42 which is connected to multi-pin jack 46. In this mode, speaker 26 on TV 24 is not used and the television receiver is set for minimum volume. In the mode corresponding to a subscriber using a stereo TV, the external channel ¾ modulator is required, with its connections being made to coaxial output jack 34 and video terminal 36. As mentioned, the separate audio and video outputs may be used with a VCR.

The circuit connections and operational details of the prior art converter in FIG. 1 and the converter portion of FIG. 2 are well known in the art. In particular, the signals available on lead C2 comprise both video information and a 4.5 MHz aural intercarrier. The so-called SNX lead carries an SNX (sound normal switch) signal that is produced in the converter/decoder and which is responsive to a control signal from the cable head-end for enabling the converter to process sound signals and for disabling or preventing processing of sound signals. The MAE lead (representing a converter memory address location "AE") is also addressable from the cable head-end. Thus, the head-end may set the bit at memory address "AE" to enable reception of authorized channels by the individual addressable converter/decoders. Stereo interface means 32 may either be built into the converter initially or wired in later as a so-called "field retrofit". It should be noted that a two-wire cable 38 connects to the multi-pin jack 46 of stereo adapter 44. This is accomplished by virtue of stereo interface means 32 which provides the appropriate signals at the output terminal, that is at output jack 34.

Figure 3:
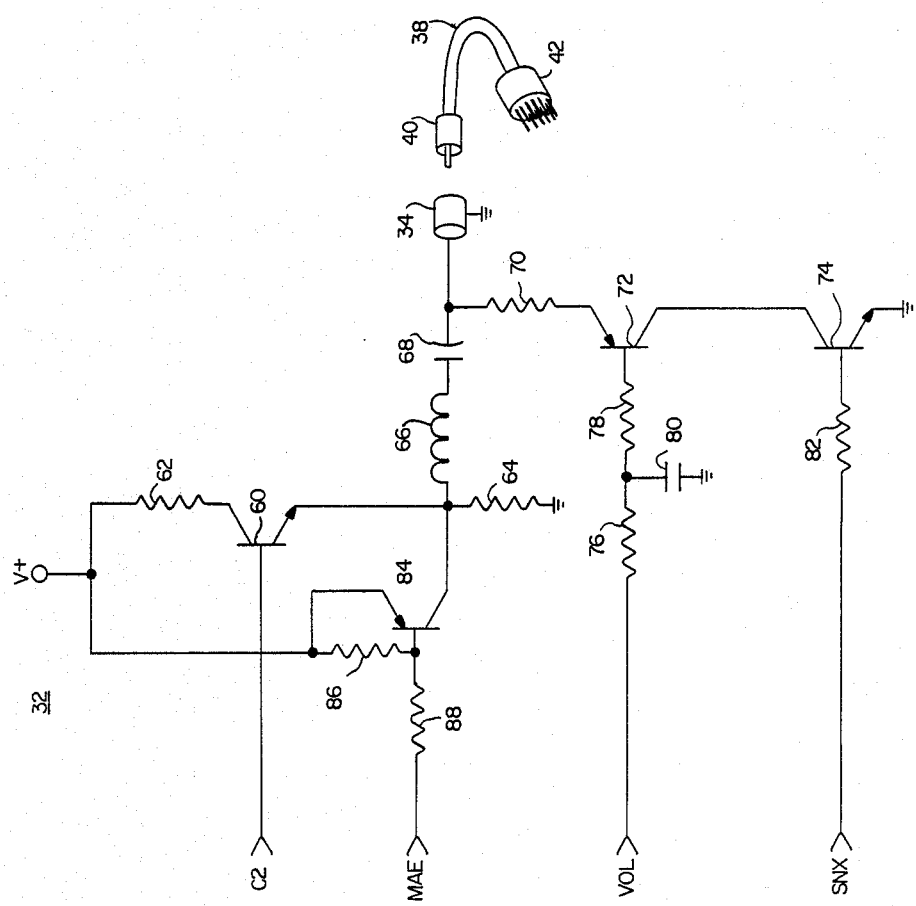
FIG. 3 is a schematic diagram of a portion of the cable converter of FIG. 2.

In FIG. 3, a schematic diagram of the circuitry of stereo interface means 32 is shown. An NPN transistor 60 has its collector connected to a +V voltage source through a load resistor 62 and its emitter connected to ground through a resistor 64. The base of transistor 60 receives the C2 signal which includes the 4.5 MHz aural intercarrier and video information. The emitter of transistor 60 is coupled through an inductor 66, connected in series with a capacitor 68, to output jack 34. Inductor 66 and capacitor 68 filter out the video information. Thus, only the 4.5 MHz aural intercarrier is supplied to jack 34. This is necessary to prevent low frequency video from modulating the DC volume control voltage at jack 34. Volume control is provided by means of a PNP transistor 72 that has its emitter connected to output jack 34 through a resistor 70 and its collector connected to the collector-emitter circuit of an NPN transistor 74 that functions as a switch. Emitter current for transistor 72 is provided by the external accessory unit volume control circuitry that provides smooth continous changes in volume by means of corresponding changes in emitter current for transistor 72. The base of transistor 72 is supplied through a low pass filter "T" arrangement of resistors 76, 78 and capacitor 80, with the microcomputer digital volume control signal being carried by the VOL lead. The capacitor and resistor combination provide filtering to produce the DC volume control voltage.

Assuming transistor 74 is conductive, the emitter current for transistor 72 is supplied from a current source (not shown) that is coupled to output jack 34. Consequently, the DC voltage level on output jack 34 is dependent upon the degree of conduction of transistor 72 that in turn, is dependent upon the DC level of the VOL lead. Thus, the signal at output jack 34 consists of a 4.5 MHz aural intercarrier "riding on" a DC voltage, the level of which is related to the desired volume level of the audio signal.

Switch transistor 74 has its collector connected to the collector of transistor 72 and its emitter connected to ground. The base of transistor 74 is connected, through a resistor 82, to the SNX lead and, consequently, an appropriate SNX signal (low) on this lead will drive transistor 74 nonconductive and allow the DC level of output jack 34 to rise to its maximum value. This maximum value is selected to correspond to the voltage level that assures muting of the audio signal. Thus, the SNX signal, which is under control of the cable head-end, may be used for authorization control of selected channels.

The MAE lead supplies an MAE (memory address AE) signal through a resistor 88 to the base of a PNP transistor 84, the collector of which is connected to the emitter of transistor 60. Its emitter is connected to +V and emitter-base bias is provided by resistor 86. An appropriate MAE signal (low) at the base of transistor 84 will drive transistor 84 conductive to block coupling of the 4.5 MHz aural intercarrier to output jack 34 by turning off transistor 60. This circuitry is considered to be optional, and may be used by certain operators to exert 4.5 MHz output authorization control independent of program video/audio authorization control.

Figure 4:
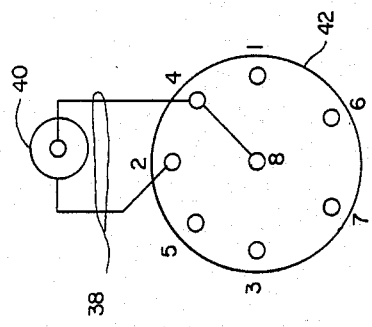
FIG. 4 is a diagram showing the interconnection between the single output of the converter of the invention and the multiple pin input jack of a stereo audio adapter.

In FIG. 4, end views of coaxial plug 40 and multi-pin DIN plug 42 are shown. Plug 42 is adapted to mate with the DIN type jack 46 in the CV 524 stereo adapter. By interconnecting pins 4 and 8 of DIN plug 42 and connecting them to the center terminal of plug 40 and by connecting the outer terminal of plug 40 to pin 2 of the DIN plug 42, the above-mentioned CV 524 stereo adapter is enabled to cooperate with the interface circuit and to operate with the signals and control functions available at the single output jack 34. Consequently it is unnecessary to provide either multiple outputs, or a corresponding DIN jack, on the converter. A simple coaxial output jack suffices at a significant savings in cost. Also, the separate video terminal 36 on converter 10' enables subscribers with stereo television receivers to use their stereo TV receivers with the converter of the invention by purchasing a relatively low cost channel ¾ modulator.

It is recognized that those skilled in the art will perceive numerous modifications and changes in the described embodiment of the invention without departing from its true spirit and scope. The invention is to be limited only as defined in the claims.

What is claimed is:

1. A converter, including an input terminal, a video output terminal and an audio output terminal, for translating received television signal transmissions including a video signal and a stereo audio signal comprising:
    means for receiving said television signal transmissions at said input terminal and for developing therefrom said video signal and a 4.5 MHz aural intercarrier containing said stereo audio signal;
    means supplying said video signal to said video output terminal;
    means for developing a variable DC audio level signal for enabling control of the volume level of said stereo audio signal in an uninterrupted continuously variable manner; and
    interface means for combining said 4.5 MHz aural intercarrier with said variable DC audio level signal and for applying them to said audio output terminal.

2. The converter of claim 1 wherein said variable DC audio level signal is adjustable to a mute level for muting said stereo audio signal in said television signal transmission.

3. The converter of claim 2 wherein said interface means include:
    an authorized signal terminal and a volume signal terminal;
    a volume control transistor coupled to said volume signal terminal; and
    a switch transistor connected in the load circuit of said volume control transistor and coupled to said authorized signal terminal for cutting off said volume control transistor.

4. A converter for translating a television signal transmission having a video signal and a stereo audio signal comprising:
    means for receiving said television signal transmission and for developing therefrom said video signal and a 4.5 MHz aural intercarrier containing said stereo audio signal;
    means for developing a variable DC audio level signal that is continuously variable in an uninterrupted manner from a remote point, said variable DC audio level signal having a mute level for muting said stereo audio signal in said television signal transmission; and transistor interface means for combining said 4.5 MHz aural intercarrier and said variable DC audio level signal and for applying them to a common output jack.

5. A converter for receiving a television signal transmission including a video signal and a stereo audio signal and means for supplying said video signal to a terminal and for supplying a stereo audio signal adapter including a multi-pin jack having certain pins for receiving, respectively, a 4.5 MHz aural intercarrier, a DC volume control signal and a mute signal comprising:

means for developing a 4.5 MHz aural intercarrier including said stereo audio signal from said received television signal transmission;

means for developing a variable DC volume control signal that is continuously variable in an uninterrupted manner and that includes a level corresponding to said mute signal for controlling the muting and the level of said stereo audio signal in said television signal transmission;

interface means for combining said 4.5 MHz aural intercarrier and said variable DC volume control signal and for applying them to a single coaxial output jack;

a cable interconnect having a coaxial plug at one end for connection to said coaxial output jack and a mating multi-pin plug at the other end for connection to said multi-pin jack; and means interconnecting said cetain pins of said multi-pin plug.

* * * * *